United States Patent [19]
Fabbri

[11] Patent Number: 5,795,624
[45] Date of Patent: Aug. 18, 1998

[54] PROCESS FOR COATING ELASTOMERIC MATERIAL

[75] Inventor: Augusto Fabbri, Riccione, Italy

[73] Assignee: Enichem S.p.A., Milan, Italy

[21] Appl. No.: 943,159

[22] Filed: Oct. 3, 1997

[30] Foreign Application Priority Data

Oct. 28, 1996 [IT] Italy .................... MI96A2232

[51] Int. Cl.⁶ .................................. B05D 1/36
[52] U.S. Cl. ........................ 427/412.1; 428/318.6
[58] Field of Search ............... 427/412.1; 428/318.6

*Primary Examiner*—Terressa Mosley
*Attorney, Agent, or Firm*—Oblon, Spivak, McClelland, Maier & Neustadt, P.C.

[57] ABSTRACT

Process for coating and protecting elastomers, particularly EP(D)M elastomeric polymers, by the application of a coating to the above elastomers, consisting of at least one layer of protective material (material A), optionally reinforced with one or more layers of reinforcing material (material B), characterized in that:

material A essentially consists of an expanded material selected from (i) branched or linear polyethylenes, (ii) ethylene-vinylacetate copolymer with a content of vinyl acetate of from 2 to 18%, ionomeric resins, branched propylenes, and the relative mixtures, material B essentially consists of a non-expanded material again selected from (i), (ii), and the relative mixtures.

6 Claims, No Drawings

PROCESS FOR COATING ELASTOMERIC MATERIAL

The present invention relates to a process for coating elastomers, particularly elastomeric ethylene-propylene (EPM) copolymers and ethylene-propylene-diene (EPDM) terpolymers, with an easily detachable material.

It is well known that almost all elastomers (for example EP(D)M copolymers, block copolymers, polybutadiene, styrene—butadiene rubbers, acrylic rubbers, nitrilic rubbers), are sticky substances.

This creates considerable problems when the above elastomers must be coated with protective materials suitable for preserving them from degradation, for example for storage and transportation.

In fact, owing to their stickiness, elastomers adhere to the coating material with consequent problems for the consumer, who has great difficulty in separating the coating material from the elastomer.

A material has now been found which overcomes this inconvenience, in that it is capable of efficiently coating elastomers but at the same time can be separated from them without difficulty.

In accordance with this the present invention relates to a process for coating and protecting elastomers, particularly EP(D)M elastomeric polymers, by the application of a coating to the above elastomers, consisting of at least one layer of protective material (material A), optionally reinforced with one or more layers of reinforcing material (material B), characterized in that:

material A essentially consists of an expanded material selected from (i) branched or linear polyethylenes, (ii) ethylene-vinylacetate copolymer with a content of vinyl acetate of from 2 to 18%, ionomeric resins, branched propylenes, and the relative mixtures, material B essentially consists of a non-expanded material again selected from (i), (ii), and the relative mixtures.

In one form of embodiment, when it is not necessary for the coating material to have mechanical properties (when the bales need not to stick to each other and the same are used with the wrapping), the protective layer (or layers) of the elastomeric material simply consists of at least one layer of expanded material (A), preferably a single layer of expanded material.

In another embodiment, when, on the contrary, it is necessary to separate the rubber bales from the film of protective material, the coating material must have the appropriate mechanical properties for facilitating the peeling operation; in this case it will consist of at least one layer of expanded material (A) and at least one layer of non-expanded material (B), preferably one layer of non-expanded material (B) covered with two layers of expanded material (A).

As mentioned above, polyethylenes belonging to the group of LLDPE (linear low density polyethylene), ULDPE (ultra low density polyethylene) and VLDPE (very low density polyethylene) can be used as material (A) or (B).

As is known, these are copolymers of ethylene and propylene, ethylene and butene, ethylene and hexene, ethylene and octene.

EVA (ethylene-vinyl acetate) copolymers, having an ethylene content of between 2 and 18% by weight, preferably from 4 to 14%, and ionomeric resins, can also be used.

The difference between the two materials (A) and (B) consists in the fact that material (A) is an expanded material, whereas material (B) is a non-expanded material.

The expanded materials which can be used in the process of the present invention are well known to experts in the field.

The above expanded materials, such as (A) and (ABA), can be prepared by both bubble and cast, mono-layer and/or multilayer extrusion techniques.

The following examples provide a better understanding of the present invention.

EXAMPLES

The peeling tests were carried out manually at the industrial plant as it was not possible to reproduce in the laboratory and/or set up analytical techniques capable of providing results which could distinguish a more suitable end-product from a less suitable one.

The separation tests of the films from the elastomeric lump are considered positive when the film can be detached without breaking or undergoing excessive and permanent deformation.

The mechanical characteristics relating to the stress-elongation tests in directions L and T of end-products of the type A and ABA, prepared using polyethylene, are indicated in table 1.

The differences are evident and confirm the necessity of having an end-product of the type ABA when the film must be easily separated from the bale.

Tests carried out in a Bambury confirm the perfect mixability of the film of both type A and type ABA with rubber, when the consumers do not intend to separate the film from the bale.

TABLE 1

| ANALYSIS | TYPE OF FILM | | | | NORM. |
|---|---|---|---|---|---|
| | Film A | | Film ABA | | |
| Thickness (microns) | 100 | 100 | 100 | 100 | ISO 4593-93 |
| Extrusion direction | MD | TD | MD | TD | |
| Elmendorf laceration (N/mm) | 7.5 | 40 | 30 | 45 | ASTM D1922-93 |
| Yield point (N/mmq) | 6 | 5 | 10 | 10 | ASTM D882-91 |
| Ultimate tensile stress (N/mmq) | 10 | 6 | 23 | 21 | |
| Elongation to break (%) | 300 | 100 | 350 | 600 | |

I claim:

1. A process for coating and protecting an elastomer comprising applying a coating to said elastomer, said coating comprising at least one layer of protective material (material A), optionally reinforced with one or more layers of reinforcing material (material B), wherein:

material A consists essentially of an expanded material selected from the group consisting of (i) branched or linear polyethylenes, (ii) ethylene-vinylacetate copolymer with a content of vinyl acetate from 2 to 18%, (iii) ionomeric resins, (iv) branched propylenes, and mixtures thereof, material B consists essentially of a non-expanded material again selected from the group consisting of the material A materials.

2. The process according to claim 1, wherein materials A and B consist essentially of expanded and non-expanded polyethylene, respectively.

3. The process according to claim 2, wherein the polyethylenes are selected from the group consisting of LLDPE (linear low density polyethylene), ULDPE (ultra low density polyethylene) and VLDPE (very low density polyethylene).

4. The process according to claim 1, wherein the coating consists essentially of a layer of expanded material (A).

5. The process according to claim 1, wherein the coating consists essentially of a layer of non-expanded material (B) covered with two layers of expanded material (A).

6. The process according to claim 1, wherein the elastomer is an EP(D)M elastomeric polymer.

* * * * *